(12) United States Patent
Shippy

(10) Patent No.: US 8,811,412 B2
(45) Date of Patent: Aug. 19, 2014

(54) STEERING DATA COMMUNICATIONS PACKETS AMONG SERVICE APPLICATIONS WITH SERVER SELECTION MODULUS VALUES

(75) Inventor: Gary R Shippy, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1322 days.

(21) Appl. No.: 12/579,739

(22) Filed: Oct. 15, 2009

(65) Prior Publication Data

US 2011/0090912 A1   Apr. 21, 2011

(51) Int. Cl.
H04W 4/00 (2009.01)
H04L 12/28 (2006.01)

(52) U.S. Cl.
USPC ......... 370/400; 370/328; 370/329; 370/395.5

(58) Field of Classification Search
None
See application file for complete search history.

(56) References Cited

U.S. PATENT DOCUMENTS

| | | | |
|---|---|---|---|
| 6,006,264 A | 12/1999 | Colby et al. | |
| 6,788,692 B1 | 9/2004 | Borden et al. | |
| 6,954,784 B2 | 10/2005 | Aiken, Jr. et al. | |
| 6,963,917 B1 | 11/2005 | Callis et al. | |
| 7,254,626 B1 | 8/2007 | Kommula et al. | |
| 7,307,948 B2 | 12/2007 | Infante et al. | |
| 7,330,900 B2 | 2/2008 | Burger et al. | |
| 7,346,702 B2 | 3/2008 | Haviv | |
| 7,415,523 B2 | 8/2008 | O'Rourke et al. | |
| 7,426,561 B2 | 9/2008 | Dani et al. | |
| 7,509,646 B1 | 3/2009 | Maw et al. | |
| 2006/0239196 A1* | 10/2006 | Khanna et al. | 370/235 |
| 2007/0061813 A1 | 3/2007 | Beal et al. | |
| 2008/0244613 A1* | 10/2008 | Parthasarathy et al. | 719/313 |
| 2008/0317038 A1* | 12/2008 | Pasko et al. | 370/395.5 |
| 2009/0175550 A1* | 7/2009 | Taleb | 382/253 |

OTHER PUBLICATIONS

Apostolopoulos, et al.; Design, Implementation and Performance of A Content-Based Switch; 2000; pp. 1117-1126; IEEE; US.
Herkersdorf, et al.; Load Balancing for Variable Sized Connections with Dynamically Changing Bandwidth Requirements; Oct. 1, 1992; pp. 435-438; vol. 35, No. 5; IP.com.
http://publib.boulder.ibm.com/infocenter/zvm/v5r3/topic/com.ibm.zvm.v53.hcpa6/hcsc9b2171.htm.
IBM TDB; IP.com Prior Art Database Technical Disclosure Load Balancer—Switch—Interface; Feb. 1, 2002; pp. 1-4.

* cited by examiner

Primary Examiner — Faruk Hamza
Assistant Examiner — Diane Lo
(74) Attorney, Agent, or Firm — Brandon C. Kennedy; Katherine S. Brown; Biggers Kennedy Lenart Spraggins LLP

(57) ABSTRACT

Steering data communications packets for transparent, bump-in-the-wire data processing among multiple service applications; the service applications executing on servers organized in groups, each server in a server group executing an instance of a same service application, including selecting an instance of each of the service applications to process a packet; identifying a server selection value for each packet as a single integer value that yields server selection modulus values that identify each instance of each of the service applications to process the packet; and steering, by the switches in dependence upon the server selection modulus values, each packet to each instance of each of the service applications to process the packet.

18 Claims, 7 Drawing Sheets

STEERING DATA COMMUNICATIONS PACKETS AMONG SERVICE APPLICATIONS WITH SERVER SELECTION MODULUS VALUES

BACKGROUND OF THE INVENTION

1. Field of the Invention

The field of the invention is data processing, or, more specifically, methods, apparatus, and products for link-level data communications, particularly steering data communications packets for transparent, bump-in-the-wire processing among multiple service applications by use of server selection modulus values.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas that has seen substantial improvement is data communications through packet switching. Today many systems provide processing of data communications packets that is transparent to the operations of the source computer, the sender, and the destination of the packets. That is, neither the source nor the ultimate destination of the packets is ever made aware that such transparent processing occurs. Such transparent processing may include for example security processing, load balancing functions among data communications equipment, statistical surveys, and so on. Such transparent processing can include processing by not just one, but several interim service applications, one providing security services, another performing statistical surveys, another performing load balancing, and so on.

When data packets are to be processed by several service applications the problem of routing the data stream from one service application to another naturally arises. For service applications that carry out packet analysis and therefore operate in 'bump-in-the-wire promiscuous mode,' that is, transparently and invisibly sitting between two or more networking devices listening to all packets exchanged between the devices, preserving the packet headers is required. Because such service applications commonly perform inspection on the packet headers and the payload, the entire packet—payload+headers—must be considered "payload" to this kind of service application. Apparatus that steers packets among such bump-in-the-wire service application must return each packet it handles to the external networks with the original header addresses intact so as not to interfere with the overall transmission of the packet from its original source to its ultimate destination.

Prior art has attempted to solve this problem by encapsulating the entire packet—payload+headers—and wrapping it with a new header that specifies the routing of the packet to bump-in-the-wire applications. This new encapsulation header must be understood by all the various hardware, switches, NICs, and so on, and potentially even by the bump-in-the-wire service applications themselves. This requirement to process this additional layer of headers is a burden to hardware developers and application providers who must now design, develop, test, and support an additional configuration of their core product. In addition, some solutions require that application providers not only integrate new header processing, but also port their application to specific hardware and operating system platforms.

SUMMARY OF THE INVENTION

Methods, apparatus, and computer program products are described for steering data communications packets for transparent, bump-in-the-wire data processing among multiple service applications, the method implemented with link-level data communications switching apparatus disposed among two or more data communications networks, the switching apparatus including a steering control engine and link-level data communications switches; the steering control engine being a module of automated computing machinery coupled for data communications to the link-level data communications switches, each link-level data communications switch including data communications ports, a plurality of the ports connected for data communications to the service applications; the service applications organized in sets, each set of service applications including a plurality of service applications that process a packet in a predefined sequence through the service applications in the set; the service applications executing on servers, the servers organized in groups, each server in a server group executing an instance of a same service application, each instance of a service application identified by a server selection modulus value that is unique among the instances of a service application executing on the servers in a server group; including receiving, in the steering control engine from a source network, data communications packets directed to a destination network; selecting, by the steering control engine for each packet, an instance of each of the service applications to process the packet; identifying, by the steering control engine for each packet, a server selection value being a single integer value that yields, by modulus operations, server selection modulus values that identify each instance of each of the service applications to process the packet; and steering, by the switches in dependence upon the server selection modulus values, each packet to each instance of each of the service applications to process the packet.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
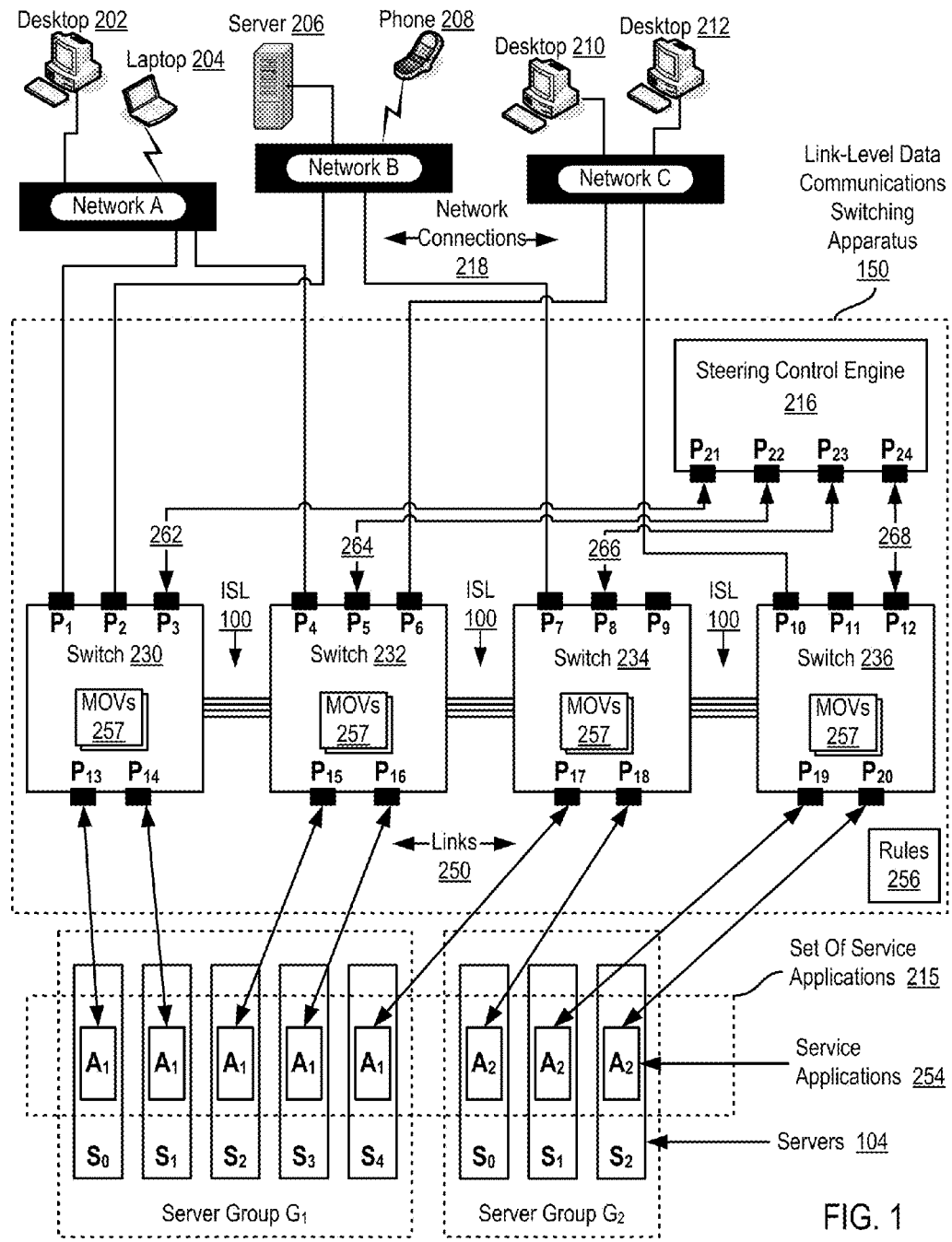
FIGS. 1 and 2 set forth functional block diagrams of example apparatus for steering data communications packets for transparent, bump-in-the-wire processing among multiple service applications according to embodiments of the present invention.

Example methods, apparatus, and products for steering data communications packets for transparent, bump-in-the-wire processing among multiple service applications in accordance with the present invention are described with reference to the accompanying drawings, beginning with FIG. 1. FIG. 1 sets forth a functional block diagram of automated computing machinery, example automated apparatus for steering data communications packets for transparent, bump-in-the-wire processing among multiple service applications according to embodiments of the present invention. The apparatus of FIG. 1 includes link-level data communications switching apparatus (150) that is made up of several link-level data communications switches (230, 232, 234, 236) and a steering control engine (216). The switches are connected through network connections (218) to several data communications networks (A, B, C) and through link-level data communications connections (250) to service applications (254) executing on servers (104). Each link-level data communications switch (230, 232, 234, 236) includes data communications ports ($P_1$ $P_{20}$), and a plurality of the ports ($P_{13}$-$P_{20}$) are connected for data communications to the service applications (254). The steering control engine is a module of automated computing machinery coupled for data communications through links (262, 264, 266, 268) to the link-level data communications switches.

The service applications are organized in sets (215), each set of service applications including a number of service applications that process a packet in a predefined sequence through the service applications in the set. For convenience of explanation, this example illustrates only one such set (215), although readers will recognize that apparatus that steers data communications packets according to embodiments of the present invention can include any number of such sets of service applications.

The service applications execute on servers (104), and the servers are organized in groups ($G_1$, $G_2$), with each server in a group executing one instance of a same service application. In this example, two service applications ($A_1$, $A_2$) are executing, five instances of service application $A_1$ and three instances of service application $A_2$. In addition, each instance of a service application is identified by a server selection modulus value that is unique within a set of service applications among the instances of a service application executing on the servers in a server group. In this example, the server selection modulus values are indicated by the suffixes of the server designations, $S_0$, $S_1$, $S_3$, and so on, so that the first instance of service application $A_1$ is executing on server $S_0$ in server group $G_1$, the second instance of service application $A_1$ is executing on server $S_1$ in server group $G1$, and so on, with the third instance of service application $A_2$ executing on server $S_2$ in server group $G_2$.

A 'service application,' as the term is used here, is a module of automated computing machinery configured to carry out data processing tasks with regard to data communications packets without altering the packets. In the examples in this specification, the steering control engine configures packets, typically by altering a link-level identifier, a MAC address or a WWID, using it as a repository for a server selection value or a identifier of a set of service applications through which a packet is to be steered by the switches. The service applications themselves, however, generally do not modify packets.

The packets travel to and from the switching apparatus (150) on data communications networks between a source network and a destination network, and the service applications carry out data processing tasks regarding the packets in a manner that is transparent to the operations of the sources as well as the destinations of the packets. Such data processing with regard to the packets can be 'transparent' because the packets are not altered by the service applications, and any modifications made by the steering control engine are repaired by the steering control engine before packets are returned to the networks. The data processing tasks carried out by service applications include, for example, security processing, load balancing functions among data communications equipment, statistical surveys, and so on. Such transparent processing can include processing by not just one, but several interim service applications operating in sets as mentioned above, one providing security services, another performing statistical surveys, another performing load balancing, and so on. The term 'bump-in-the-wire' as applied to the service applications here refers to the fact that, from the point of view of the source or destination, the service applications are physically in-line with the network architectures—as opposed to 'bump-in-the-stack' service applications that may manipulate layer 2/3 protocols like VLANs, ARP, and DHCP to control access to the service applications.

The terms 'link-level' and 'layer-2' both refer to the data link layer of the Open Systems Interconnection Reference Model ('OSI Model'). The data link layer is often referred to in this specification as the 'link layer' or the 'link level.' The first, third, and fourth layers of the OSI Model, also pertinent to this discussion, are the Physical Layer, the Network Layer, and the Transport Layer respectively. The Physical Layer of the OSI Model defines the electrical and physical specifications for data communications devices, typically devices connected in effect to a local area network or 'LAN.' Layer 3 or the Network Layer of the OSI Model provides functional and procedural means of transferring variable length data sequences from a source to a destination via one or more networks, generally including routing functions. The Network Layer is implemented with routers that communicate with one another according to data communications protocols. The well known Internet Protocol ('IP') operates generally as an OSI Network Layer data communications protocol. In fact, although IP is definitely not the only Network Layer protocol, IP is so ubiquitous at this point in time as to be almost a synonym for Network Layer functionality. Examples of other layer 3 protocols include ICMP, IGMP, and IPsec. The Transport Layer provides reliable data transfer services to the other layers. The Transport Layer controls the reliability of a given link through flow control as well as segmentation and desegmentation of packets. Transport Layer protocols are typically connection oriented. By far the most common examples of Transport Layer protocols are the Transmission Control Protocol ('TCP') and the User Datagram Protocol ('UDP'). Examples of other layer 4 protocols include DCCP, SCTP, RSVP, and ECN.

The data link layer of the OSI Model is implemented with switches that communicate with one another according to link layer data communications protocols. Like IP in the network layer, the Ethernet protocol, not the only link-level protocol, nevertheless is so ubiquitous as to be almost synonymous with the link layer. Examples of other link-level protocols include ARP, RARP, NDP, OSPF, and L2TP. Link-level switches connect to other devices, typically on a LAN, through connections referred to as 'ports.' Ports can be implemented as wireless connections as well as wireline connections. Each wireline port is made up of the connectors, interconnections, electrical or optical conductors, and so on, as required to effect connections from the switch to other devices, such other devices including, for example, computers on a LAN, other switches, routers, and so on. Wireless ports may include antennas, amplifiers, other radio components, and the like, as needed to effect wireless communications between a switch and other devices. A switch receives data communications in data units referred to as 'packets.' It is common in the art to refer to link layer data units as 'frames,' but this specification uses the slightly more descriptive term 'packets.' In this specification, the term 'packet' refers to all data units in data communications, including units travelling in the physical layer, in the network layer, and in other layers as well.

Each data communications switch (230, 232, 234, 236) in the example of FIG. 1 is a device of the kind sometimes referred to as a bridge, an n-port bridge, a layer-2 switch, a smart switch, or just a 'switch.' In the example of FIG. 1, the switches are organized in a single layers with each switch connected through network connections (218) to data communications networks (A, B, C) and to the steering control engine (216). Each of the switches is also connected to through level-2 links (250) to an instance of a service application, $A_1$ or $A_2$, executing on servers $S_0$-$S_4$ in server group $G_1$ and $S_0$-$S_2$ in server group $G_2$. Within the scope of the present invention, any link-level switch having a number of ports sufficient to support such connectivity among the networks (A, B, C), the steering control engine (216), and the service applications ($A_1$, $A_2$) can be improved to carry out packet steering according to embodiments of the present invention, including, for example, ordinary Ethernet switches. In many embodiments, however, switches that are improved for packet steering according to embodiments of the present invention will be fabric-type switches, Fibre Channel switches, Infiniband switches, Ethernet Fabric switches, and so on.

In the example of FIG. 1, the servers (104) are organized into groups ($G_1$, $G_2$). Such groupings of servers can be implemented, for example, as link aggregation groups. A 'link aggregation group' ('LAG') is a computer networking term which describes using multiple network cables and ports in parallel to increase link speed beyond the limits of any one single cable or port—and to increase the redundancy for higher availability. A LAG is made up of multiple links that are aggregated together, so that the link aggregation group can be treated as though it were a single link. LAGs are used to "trunk" links together so that data communications can be distributed and load balanced across the multiple links to provide improved throughput and redundancy compared to a single link. Networks that support link aggregation typically operate a link aggregation protocol that presents multiple physical links to the network as a single logical link. Many LAG implementations conform to an IEEE standard, IEEE 802.1AX. Other terms for link aggregation include 'port teaming,' 'port trunking,' and 'link bundling.'

In the example of FIG. 1, each of the switches is further connected directly to another by an Inter-Switch Link ('ISL') (100). The ISLs (100) in this example are optional reminders that the switches in the switching apparatus of FIG. 1 can be fully functional standalone switches, or they can be implemented as stacked switches, coupled by high-speed inter-switch links, operating a stacking protocol that shares configuration data and other administrative data across the switches and presents a single IP address to a system management server for administrative purposes. The ISLs (100) in FIG. 1 can be embodied, for example, as an Ethernet link over which data communications between switches are encapsulated according to the Cisco™ Inter-Switch Link protocol. The ISLs (100) in FIG. 1 can also be embodied, for a further example, as a connection between the Expansion Ports, or E_ports, of two Fibre Channel switches.

The link-level data communications switching apparatus of FIG. 1 also includes a plurality of data communications ports. In the example of FIG. 1, six of the ports ($P_1$, $P_2$, $P_4$, $P_6$, $P_7$, $P_{10}$) couple the switching apparatus (150) to three data communications networks, networks A, B, and C. Each network is connected to a plurality of devices that function as sources and destinations of data communications packets traveling between networks in a pair. Such source and destination devices in this example include desktop computers (202, 210, 212), a laptop computer (204), a server (206), and a mobile phone (208). In the example of FIG. 1, eight additional ports ($P_{13}$-$P_{20}$) in the switching apparatus (150) are connected to instances of service applications (254) that carry out transparent, bump-in-the-wire data processing of data communications packets traveling among the networks. Each such port is typically identified by a unique, link-level identifier. Examples of link-level identifiers include a Media Access Control ('MAC') address and a World Wide Name ('WWN') or World Wide Identifier ('WWID'). MAC addresses are used generally in Ethernet addressing, and WWNs or WWIDs are used in other contexts including, for example, Fibre Channel addressing and in Serial Attached SCSI storage networks. Although there are only eight ports expressly connected to eight instances of two service applications in this example, in fact switching apparatus that carries out packet steering for transparent packet processing according to embodiments of the present invention can include any number of connections to any number of bump-in-the-wire service applications.

The steering control engine in this example is a module of automated computing machinery that receives from a source network data communications packets directed to a destination network. Any network, A, B, or C, can function as a source or destination of packets. Packets can travel from network A through the switching apparatus to network B, from network B to network A, from network A to network C, from C to A, and so on. The example of FIG. 1 illustrates an example system architecture in which in which packets arriving in the switching apparatus (150) ingress through ports ($P_1$, $P_2$, $P_4$, $P_6$, $P_7$, $P_{10}$) on the switches, and the switches then send the packets through links (262, 264, 266, 268) to the steering control engine (216). The steering engine configures the packets for steering among the service applications, and, the steering control engine reconfigures the packet to their original condition before they exit the switching apparatus toward their destination networks, requiring another round trip from the switches to the steering control engine when a packet is ready to continue toward its destination.

Figure 2:
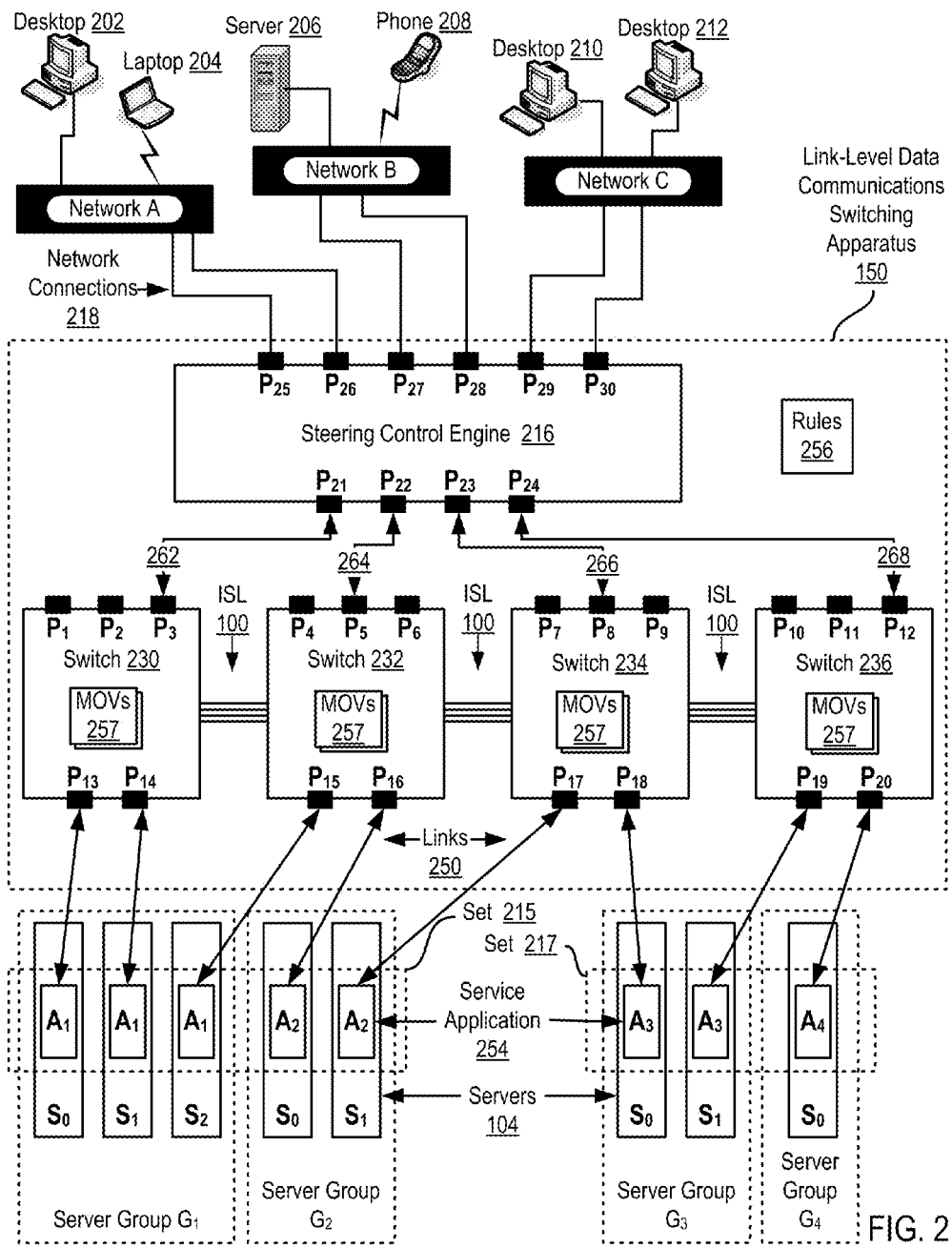

FIG. 2 illustrates an alternative architecture in which ports ($P_{25}$-$P_{30}$) on the steering control engine (216) are the only connections between the switching apparatus (150) and the networks A, B, C, so that the steering control engine (216) receives packets by receiving them directly from the networks with no need for the additional step of sending the packets from the switches to the steering control engine. In addition, when packets are ready to exit the switching apparatus in the example of FIG. 2, they exit directly from the steering control engine (216) with no need for an additional round trip through switches. The example apparatus of FIG. 2 also illustrates the case of more than one set of service applications. In particular, the example apparatus of FIG. 2 includes two sets of service applications. One set (215) of service applications includes two service applications $A_1$ and $A_2$, with server application $A_1$ implemented in three instances executing on servers $S_0$-$S_2$ in server group $G_1$ and service application $A_2$ implemented in two instances executing on servers $S_0$-$S_1$ in server group $G_2$. Another set (217) of service applications includes two service applications $A_3$ and $A_4$, with service application $A_3$ implemented in two instances executing on servers $S_0$-$S_1$ in server group $G_3$ and service application $A_4$ implemented in a single instance executing on server $S_0$ in server group $G_4$.

Again referring primarily to FIG. 1, although readers will recognize that this description also generally applies as well to the example apparatus of FIG. 2: The steering control engine (216) also selects for each packet an instance of each of the service applications to process the packet. The steering control engine can select instances of service applications, for example, according to a load balancing algorithm, Round Robin, Weighted Round Robin, Least Used, Weighted Least Used, Fastest Response Time, and so on. Alternatively, the steering control engine can select instances of service applications according to packet membership in a 'flow.' A flow is a set of packets defined according to some common characteristic. Packets in a flow can benefit from processing by a same instance of a service application. Packets on a banks virtual LAN, for example, may benefit from security processing by a bump-in-the-wire service application that maintains stateful information about the flow, information that cannot easily be maintained if packets in the flow are distributed across more than one instance of the service applications. Other examples of common characteristics optionally defining a flow are HTTP packets flowing between browsers in one network and a Web server in another network, POP packets flowing between email clients in one network and an email server in another network, and so on.

The steering control engine also identifies for each packet a server selection value that is a single integer value that yields, by modulus operations, server selection modulus values that identify each instance of each of the service applications to process the packet. That is, having selected the instances of service application to which a packet is to be steered in traversing the switching apparatus, the steering control engine then encodes that information into a single integer value, here referred to as a 'server selection value,' from which the switches can retrieve the server selection modulus values that identify each instance of the service applications that are to process the packet. The use of a single integer as a server selection value relies on several features when a modulus operator value (257), also an integer, is taken as the number of servers in a server group. The switches typically use the server group size, the number of servers in a server group, as the modulus operator value (257) for modulo operation on the server selection value. A modulus operator value (server group size) (257) is configured in the switches for each server group independently. The modulus operator value (257) as configured into the switches may actually be larger than the number of servers used within any particular server group. The server selection value is based on the selected instance of a service application (and therefore the server on which that instance executes) for each service application in a sequence, and the modulus operator value for each instance of each service application respectively. To achieve independence of server assignment among the instances of each service application, the multiple modulus operator values ought not be multiples of each other nor have a common factor. Modulus operator values of 8, 7, 5, and 3 meet these criteria while 8, 6, 5, and 3 do not. Prime numbers or powers thereof fit the criteria, and thus modulus operator values of 9, 8, 7, and 5 meet the criteria.

Thus a unique modulus operator value can be assigned to each server group. The product of the assigned modulus operator values results in the number of possible combinations of independent selections of servers, that is, of instances of service applications executing on servers, one from each server group, with its associated modulus operator value. Further a list of integers from 0 to the product of the server selection modulus values minus 1 is a set of numbers to which if each modulus operator value is applied will generate the complete set of possible server selection values. Continuing with the example of FIG. 1, assign modulus operator values of 5 and 3 respectively to server group $G_1$ and $G_2$, prime numbers representing also the size of these two server groups. The product of these two modulus operator values is 15, and the list of integers from 0 to 15-1=14 is a set of numbers to which if each modulus operator value 5 and 3 is applied will generate the complete set of possible server selection values. Tables 1 and 2 below list the set of possible server selection values with the server selection modulus values for server groups G1 and G2, having modulus operator values of 5 and 3 respectively.

TABLE 1

Server Selection Modulus Values
Sorted On Server Selection Values

| Server Selection Values | Server Selection Modulus Values For Server Group $G_1$ | Server Selection Modulus Values For Server Group $G_2$ |
|---|---|---|
| 0 | 0 | 0 |
| 1 | 1 | 1 |
| 2 | 2 | 2 |
| 3 | 3 | 0 |
| 4 | 4 | 1 |
| 5 | 0 | 2 |
| 6 | 1 | 0 |
| 7 | 2 | 1 |
| 8 | 3 | 2 |
| 9 | 4 | 0 |
| 10 | 0 | 1 |
| 11 | 1 | 2 |
| 12 | 2 | 0 |
| 13 | 3 | 1 |
| 14 | 4 | 2 |

TABLE 2

Server Selection Values Sorted On
Server Selection Modulus Values

| Server Selection Values | Server Selection Modulus Values For Server Group $G_1$ | Server Selection Modulus Values For Server Group $G_2$ |
|---|---|---|
| 0 | 0 | 0 |
| 10 | 0 | 1 |
| 5 | 0 | 2 |
| 6 | 1 | 0 |
| 1 | 1 | 1 |
| 11 | 1 | 2 |
| 12 | 2 | 0 |
| 7 | 2 | 1 |
| 2 | 2 | 2 |
| 3 | 3 | 0 |
| 13 | 3 | 1 |
| 8 | 3 | 2 |

TABLE 2-continued

Server Selection Values Sorted On
Server Selection Modulus Values

| Server Selection Values | Server Selection Modulus Values For Server Group $G_1$ | Server Selection Modulus Values For Server Group $G_2$ |
|---|---|---|
| 9 | 4 | 0 |
| 4 | 4 | 1 |
| 14 | 4 | 2 |

Although In some cases it is possible to derive a formula to calculate the base number for a selected set of instances of service applications, a table driven solution is fast, a more general solution, and therefore generally preferred. In some link-level switches there are functions (e.g., CRC16) applied prior to such a modulo function, and this can significantly complicate an algorithm to calculate a base number. However knowing the switch algorithms that are applied and that the last stage is the modulus function, a table can be reverse engineered. So configuring the steering control engine with values from such a table seems therefore to be a preferred embodiment of packet steering according to the present invention.

The server selection values and the server selection modulus values in Tables 1 and 2 are the same in both tables; only the sorts differ. Sorting on the server selection modulus value as in Table 2 puts the server selection values in a sequence that can be indexed by a calculated index value, accessing the server selection value that produces the server selection modulus values that identify particular instances of servers to which a packet is to be steered. In this example, the value of such an index can be $I=N_1 M_2 + N_2 = 3N_1 + N_2$, where $N_1$ is the server selection modulus value for an instance of a service application executing in server group $G_1$, $N_2$ is the server selection modulus value for an instance of a service application executing in server group $G_2$, and $M_2$ is modulus operator value for server group $G_2$. In an example, therefore, of identifying a server selection value for a packet to be processed by the fourth instance of a service application executing in server group $G_1$ (server selection modulus value=3) and the second instance of a service application executing in server group $G_2$ (server selection modulus value=1), the formula yields: Index I=3*3+1=10. Looking up a server selection value in Table 2 at index location 10 identifies the server selection value of 13. In this way, a steering control engine configured to identify a server selection value according to embodiments of the present invention, for apparatus implementing two server groups as in the example of FIG. 1, one server group with a modulus operator value of 5, the other with modulus operator value of 3, can be configured with a small one-dimensional array, a sorted list of the server selection values in the first column of Table 2, and identify a server selection value that will, upon modulo operations, identify each instance of each of the service applications to process the packet.

The number of entries in the table is reasonable for all practical implementations. Within a modular system with an aggregate capacity of 14 servers (e.g., blades) apportioned among four service applications with server group sizes and therefore modulus operator values respectively of 8, 7, 5, and 3, would require a table length of 840 entries. Extending this to six server groups with modulus operator values of 13, 11, 8, 7, 5, and 3 would require a table of 120,120 entries, which is still entirely reasonable. Also note that two service applications, instances of which execute in two separate server groups, which are not in any sequence together, that is, they are in separate sets of service applications, can use the same modulus operator value without any server selection restriction. Further note that an array with multiple operator modulus values for the set of service application groups can be used for any subset of service application groups in the array.

An array may be split into multiple smaller arrays if there is no case of all service applications within the same sequence. This can dramatically reduce the array size and total array storage required. For example, a single array for seven server groups with modulus values of 17, 13, 11, 8, 7, 5, and 3 would require 2,042,040 entries. If the array could be split such that one array had modulus values of 17, 11, 8, 7, and 5 while the other had modulus values of 13, 11, 8, 7, 5, and 3, then one array would have 52,360 entries while the other have 120,120 entries. Thus, for this example, there is more than an order of magnitude difference between the total storage required for the split arrays and the single array. Note that when splitting an array, there must be a resultant array which contains all the modulus values for each set of server applications for each sequence used in the system.

In the example of FIG. 1, it is the switches (230, 232, 234, 236) that steer, in dependence upon the server selection modulus values, each packet to each instance of each of the service applications to process the packet. That is, steering control engine, having selected instances of service applications to service the packets and identified a server selection value for each packet, hands the packets to the switches for steering among the service applications. The packets are provided with the server selection values (257), not the literal identities of the instances of the service applications that are to process the packets. All the instances of service applications to process a packet are indirectly identified by a single integer server selection value. The switches then infer from that single value the identities of all the instances of service applications that are to process a packet. To do this, the switches can be, for example, configured with a modulus operator value for each server group, with the modulus operator value typically determined according to the number of servers within each server group. In the example of FIG. 1, server group $G_1$ can have the modulus operator value of 5, with server group $G_2$ taking the modulus operator value of 3. With the switches in possession of the server modulus values for the server groups and each packets having a server selection value, the switches can identifying each instance of each of the service applications to process a packet according to $V_i = N \bmod M_i$ where $V_i$ is the server selection modulus value for the instance of the service application to process the packet in the $i^{th}$ server group, N is the server selection value for the packet, and $M_i$ is the modulus operator value for the $i^{th}$ server group executing instances of service applications in a set of service applications. In such an example, the server selection modulus values are not configured as separate values in the packets. Instead, the packets are provided with a single server selection value from which the switches infer the server selection modulus values that identify the instances of the service applications from the server selection values by use of a modulus operator value and a modulo operation.

In reference to FIG. 2, there are two sets of service applications. One set (215) includes service applications $A_1$ and $A_2$ and the other set (217) includes service applications $A_3$ and $A_4$. These two sets of service applications are mutually exclusive in terms of service application processing in that a packet would never be processed by a service application in one set and then another service application in the other set. In this case multiple arrays could be defined with one array for the service applications in one set and another array for service applications in the other set. In this example, server group $G_1$ can have the modular operator value of 3 and server group $G_2$ can take the modulus operator value of 2 in one array, while server group $G_3$ can have the modulus operator value of 2 and server group $G_4$ take the modulus operator value of 1 in another array. However, these arrays can be combined into one and because of the mutually exclusivity of the two sets, multiple groups can use the same modulus operators within the combined array. Thus for this example, a single array can be used where a modulus operator value of 3 can be used for both $G_1$ and $G_4$ groups, and the modulus value of 2 can be used for both $G_2$ and $G_3$ groups.

In the example of FIG. 1 and FIG. 2, the switching apparatus (150) also includes rules (256) governing the steering of data communications among service applications (254) connected to the switching apparatus (150). Each rule is composed of an association of an identifier of a set of service applications and a definition of a set of service applications, further explained with reference to Table 1.

TABLE 1

Steering Rules

| Set Identifier | Set Definition |
|---|---|
| 0 | $A_1, A_2$ |
| 1 | $A_2, A_1$ |

Each record in Table 1 associates an identifier of a set of service applications and a definition of a set of service applications. There are only two records in Table 1, but they serve to explain sets of service applications, and it is seen that the single set of service applications in the example of FIG. 1 is in fact two sets—because the sequence in which a packet is steered through the service applications is a part of the definition of a set. The first record in the example of Table 1 associates an identifier of value 0 with the set definition $A_1$, $A_2$, instructing the switches that packets bearing the set identifier 0 are to be steered first to an instance of service application $A_1$ and then to an instance of service application $A_2$. The second record in the example of Table 1 associates an identifier of value 1 with the set definition $A_2, A_1$, instructing the switches that packets bearing the set identifier 1 are to be steered first to an instance of service application $A_2$ and then to an instance of service application $A_1$. Readers will recognize that maskably configuring a packet with a set identifier for apparatus implementing two sets of service applications requires only a single bit of, for example, a destination MAC address modified by a steering control engine to identify a set of service applications through which the switches are to steer the packet. A set identifier for apparatus implementing up to four sets would need only two bits, up to eight sets, three bits, and so on.

Steering data communications packets for transparent, bump-in-the-wire processing among multiple service applications by use of server selection modulus values according to embodiments of the present invention is generally implemented with computers, that is, with automated computing machinery. In the apparatus of FIGS. 1 and 2, for example, all the networks (A, B, C), the client devices (202, 204, 208, 210, 212), the servers (206, 104), the switches (230, 232, 234, 236), and the steering control engine (216) are implemented as some form of automated computer machinery, that is, computers. For further explanation, therefore, FIG. 3 sets forth a block diagram of automated computing machinery representing an example steering control engine (216) useful in packet steering with server selection modulus values according to embodiments of the present invention.

Figure 3:
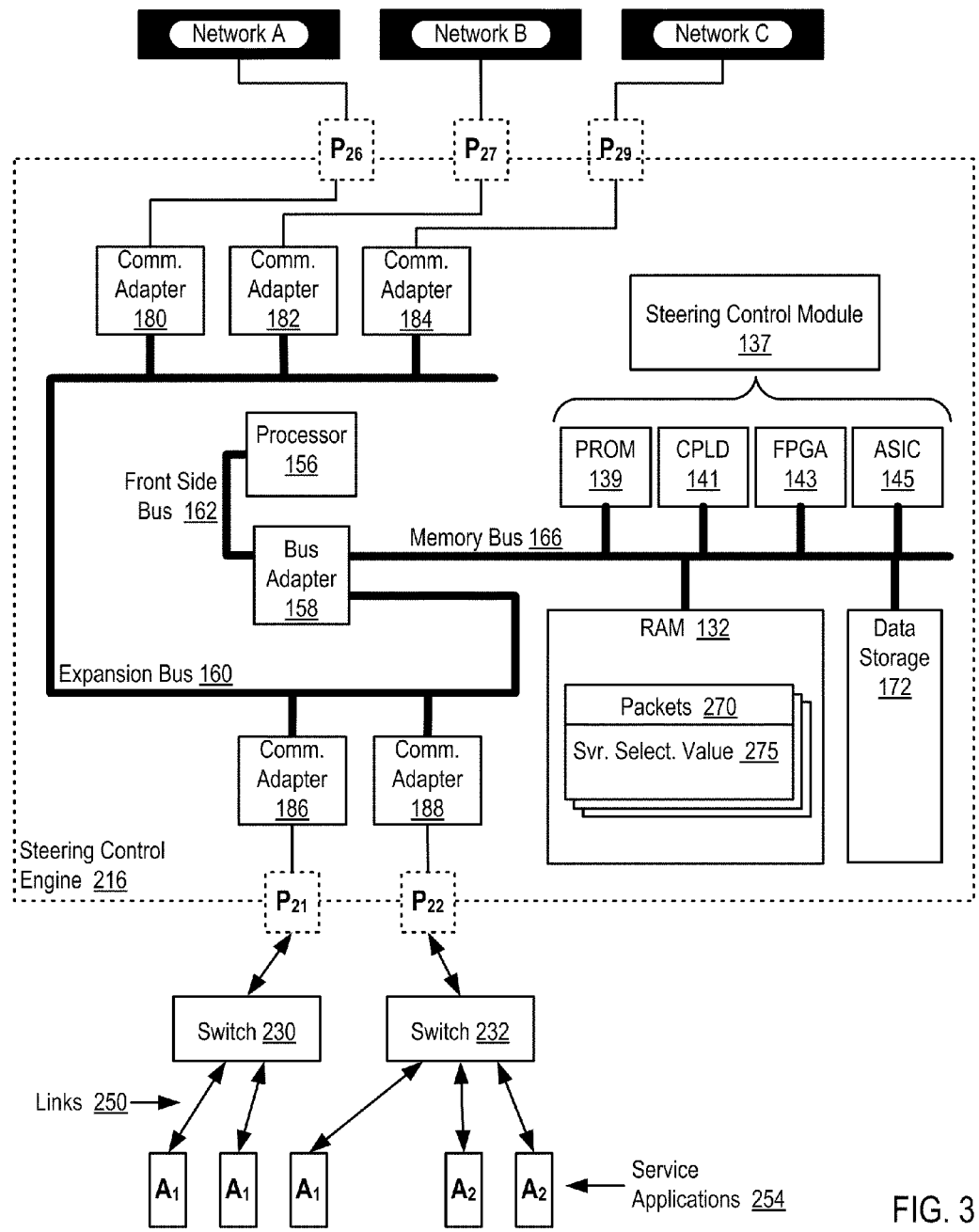
FIG. 3 sets forth a block diagram of automated computing machinery representing an example steering control engine useful in packet steering with server selection modulus values according to embodiments of the present invention.

The steering control engine (216) of FIG. 3 includes at least one computer processor (156) or 'CPU' as well as random access memory (132) ('RAM') which is connected through a high speed memory bus (166) and bus adapter (158) to the processor (156) and to other components of the steering control engine (216). In addition to RAM, the steering control engine also includes non-volatile data storage (172) operatively coupled to the processor (156). The non-volatile data storage (172) can be implemented in a number of forms as will occur to those of skill in the art, including, for example, a microdrive or electrically erasable programmable read-only memory ('EEPROM' or 'flash').

The processor (156) is also operatively coupled through an expansion bus (160) to a number of data communications ports ($P_{21}$, $P_{22}$, $P_{26}$, $P_{27}$, $P_{29}$). The processor (156) can be implemented as any of a variety of computer microprocessors or microcontrollers including, for example, a Motorola 68000™, an IBM POWER™ architecture processor, an Intel Pentium™, and so on. The processor (156) in this example is coupled to the ports through an expansion bus (160) and several communications adapters (180, 182, 184, 186, 188). The communications adapters implement data communications through the ports with other switches, routers, networks (A, B, C), computers, and service applications (254) executing on servers (104 on FIGS. 1 and 2). Such communications are so often networked that a communications adapter is often referred to as a 'network interface card' or 'NIC.' Communications adapters implement the hardware level of data communications through which one computer, router, switch, or, in this case, a steering control engine (216) sends data communications to another computer, router, or switch, directly or through a data communications network. Examples of communications adapters useful for packet steering with server selection modulus values according to embodiments of the present invention include modems for wired dial-up communications, Ethernet (IEEE 802.3) adapters for wired networked communications, and 802.11 adapters for wireless networked communications.

In the example of FIG. 3, the steering control engine (216) is configured in the overall architecture of FIG. 2, with the steering control engine implementing a data communications layer imposed between the networks (A, B, C) and the link-layer switches (230, 232). Ports $P_{26}$, $P_{27}$, and $P_{39}$ are connected through wireline connections to data communications networks A, B, and C, and ports $P_{21}$ and $P_{22}$ are connected to instances of service applications $A_1$ and $A_2$ executing on separate servers such as (104) on FIG. 1. In the example of FIG. 3, each port ($P_{21}$, $P_{22}$, $P_{26}$, $P_{27}$, $P_{29}$) is capable of functioning as an ingress port or an egress port for data communications among the networks and the switches—so that data traffic through the steering control engine (216) is generally bidirectional.

The example steering control engine (216) of FIG. 3 also includes a steering control module (137), a module of automated computing machinery configured to carry out packet steering data for transparent, bump-in-the-wire processing among multiple service applications according to embodiments of the present invention. The steering control module (137) may be implemented as, for example, a control program stored in RAM (132) or stored in a programmable read only memory ('PROM') ('139'). Or the steering control module (137) may be implemented as a complex programmable logic device ('CPLD') (141), a field programmable gate array ('143'), or as an application specific integrated circuit ('ASIC') (145).

The steering control engine (216) in this example steers packets under control of the steering control module (137) according to embodiments of the present invention by receiving from a source network (A, B, or C) data communications packets (270) directed to a destination network (A, B, or C); selecting for each packet an instance of each of the service applications to process the packet; identifying for each packet a server selection value (275) represented as a single integer value that yields, by modulus operations, server selection modulus values that identify each instance of each of the service applications to process the packet; and then handing each packet off to the link-level switches (230, 232) for steering among the service applications ($A_1$, $A_2$).

Packet steering according to embodiments of the present invention is implemented by use of link-level data communications switching apparatus that includes link-level data communications switches. For further explanation therefore, FIG. 4 sets forth a functional block diagram of an example link-level data communications switch (230) implemented as automated computing machinery and adapted for packet steering with server selection modulus values according to embodiments of the present invention. The example link-level data communications switch (230) of FIG. 4 includes at least one data communications processor (156) as well as random access memory (132) ('RAM') which is connected through a high speed memory bus (166) and bus adapter (158) to processor (156) and to other components of the link-level data communications switch (230). The data communications processor (156) is also operatively coupled through an expansion bus (160) to a number of data communications ports ($P_1$, $P_2$, $P_3$, $P_{13}$, $P_{14}$). The data communications processor can be implemented as any of a variety of computer microprocessors or microcontrollers including, for example, a Motorola 68000™, an IBM POWER™ architecture processor, an Intel Pentium™, and so on.

The processor (156) in this example is coupled to the ports through an expansion bus (160) and several communications adapters (180, 182, 184, 186, 188). The communications adapters implement data communications through the ports with other switches, routers, networks (A, B, C), computers, service applications (254) executing on servers (104 on FIG. 1), and, of course in this case, a steering control engine (216). Such communications are so often networked that a communications adapter is often referred to as a 'network interface card' or 'NIC.' Communications adapters implement the hardware level of data communications through which one computer, router, switch, or steering control engine sends data communications to another computer, router, switch, or steering control engine, directly or through a data communications network. Examples of communications adapters useful for packet steering with server selection modulus values according to embodiments of the present invention include modems for wired dial-up communications, Ethernet (IEEE 802.3) adapters for wired data communications network communications, and 802.11 adapters for wireless data communications network communications.

Figure 4:
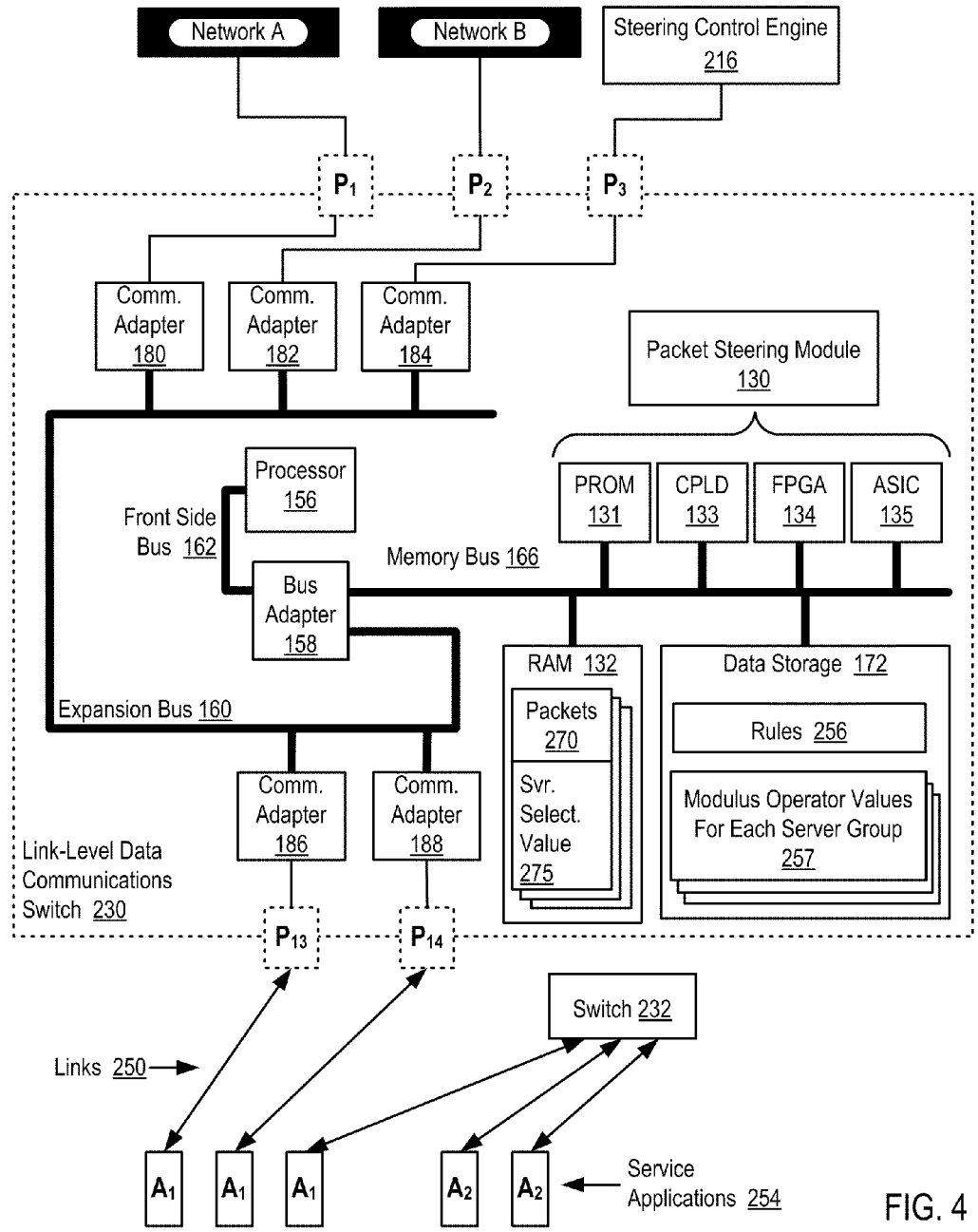
FIG. 4 sets forth a functional block diagram of an example link-level data communications switch implemented as automated computing machinery and adapted for packet steering with server selection modulus values according to embodiments of the present invention.

In the example of FIG. 4, the switch (230) is configured in the overall architecture of FIG. 1, as a component in a layer of switches (230, 232) implementing data communications between the networks (A, B, C) and the service applications (254) with packet side-trips to the steering control engine (216) for selection of instances of service applications to process packets, identification of server selection values, and so on. In the example of FIG. 4, ports $P_1$, $P_2$, and $P_3$ are connected through wireline connections to data communications networks A, B, and C. Ports $P_{13}$ and $P_{14}$ are connected to service applications ($A_1$, $A_2$) executing on servers (104 on FIG. 1). In this example, each port ($P_1$, $P_2$, $P_3$, $P_{13}$, $P_{14}$) is capable of functioning as an ingress port or an egress port for data communications among the networks, the switches, and the service applications. That is, data traffic through the link-level data communications switch (230) is generally bidirectional.

In the example of FIG. 4, the switch also includes data storage (172) operatively coupled to the processor (156). The data storage (232) can be implemented in a number of forms as will occur to those of skill in the art, including, for example, a microdrive or electrically erasable programmable read-only memory ('EEPROM' or 'flash'). The data storage has stored within it rules (256) governing the steering of data communications among the service applications (254) connected to the switch (230). The rules are composed of associations of identifiers of sets of service applications and definitions of sets of service applications, further explained above with reference to Table 1. The associations of set identifiers and set definitions can be implemented in a variety of ways as will occur to those of skill in the art, including, for example, a sequence of C-style structs, a linked list, an array with at least two dimensions, and so on. The data storage is preferably non-volatile and can be configured with the rules by a system administrator or a manufacturer. One form of data storage for the rules, possibly somewhat preferred because of its response speed, is a content addressable memory or 'CAM,' in which a set identifier and a set definition are associated by treating a set identifier as an address and treating a corresponding set definition as memory content to be looked up on the basis of a set identification number. A lookup of a rule in the CAM then is carried out by placing a set identifier, maskably retrieved from, for example, a packet's MAC address or WWID number, on an input of the CAM and reading a set definition from the output of the CAM.

The example link-level data communications switch (230) of FIG. 4 also includes a packet steering module (130), a module of automated computing machinery configured to carry out packet steering data for transparent, bump-in-the-wire processing among multiple service applications according to embodiments of the present invention. The packet steering module (130) may be implemented as, for example, a control program stored in random access memory ('RAM') (132) or stored in a programmable read only memory ('PROM') ('131'). Or the packet steering module (130) may be implemented as a complex programmable logic device ('CPLD') (133), a field programmable gate array ('134'), or as an application specific integrated circuit ('ASIC') (135).

The link-level data communications switch (230) in this example steers packets under control of the packet steering module (130) according to embodiments of the present invention by steering, in dependence upon server selection modulus values, each packet to each instance of each of the service applications to process the packet.

In addition to the steering rules (256), the switch (230) is also configured with a modulus operator value (257) for each server group ($G_1$, $G_2$ on FIG. 1), with each modulus operator value typically determined according to the number of servers within each server group. The switch (230) then steers each packet among the service applications by identifying each instance of each of the service applications to process the packet according to $V_i = N \bmod M_i$, where $V_i$ is the server selection modulus value for the instance of the service application to process the packet in the $i^{th}$ server group, N is the server selection value for the packet and $M_i$ is the modulus operator value for the $i^{th}$ server group executing instances of service applications in a set of service applications. Thus each server selection modulus value is identified by use of the packet's single server selection value and the configured modulus operator values, with no need to configure the packets themselves with the actual server selection modulus values, instead deriving them on the fly as it were. Readers will also note that steering packets among the service applications in such an example is carried out only in accordance with the rules and the server selection modulus values, using none of the traditional address information in the traditional packet headers, neither an IP address, nor a MAC address, nor a WWID number, nor any other traditional packet addressing. Readers will also notice that the switch (230) can steer broadcast packets or multicast packets reliably among the service application by this methodology, despite the fact that a broadcast or multicast packet might not even contain a destination address as such—because the steering is carried out exclusively with the rules and the server selection modulus values.

Figure 5:
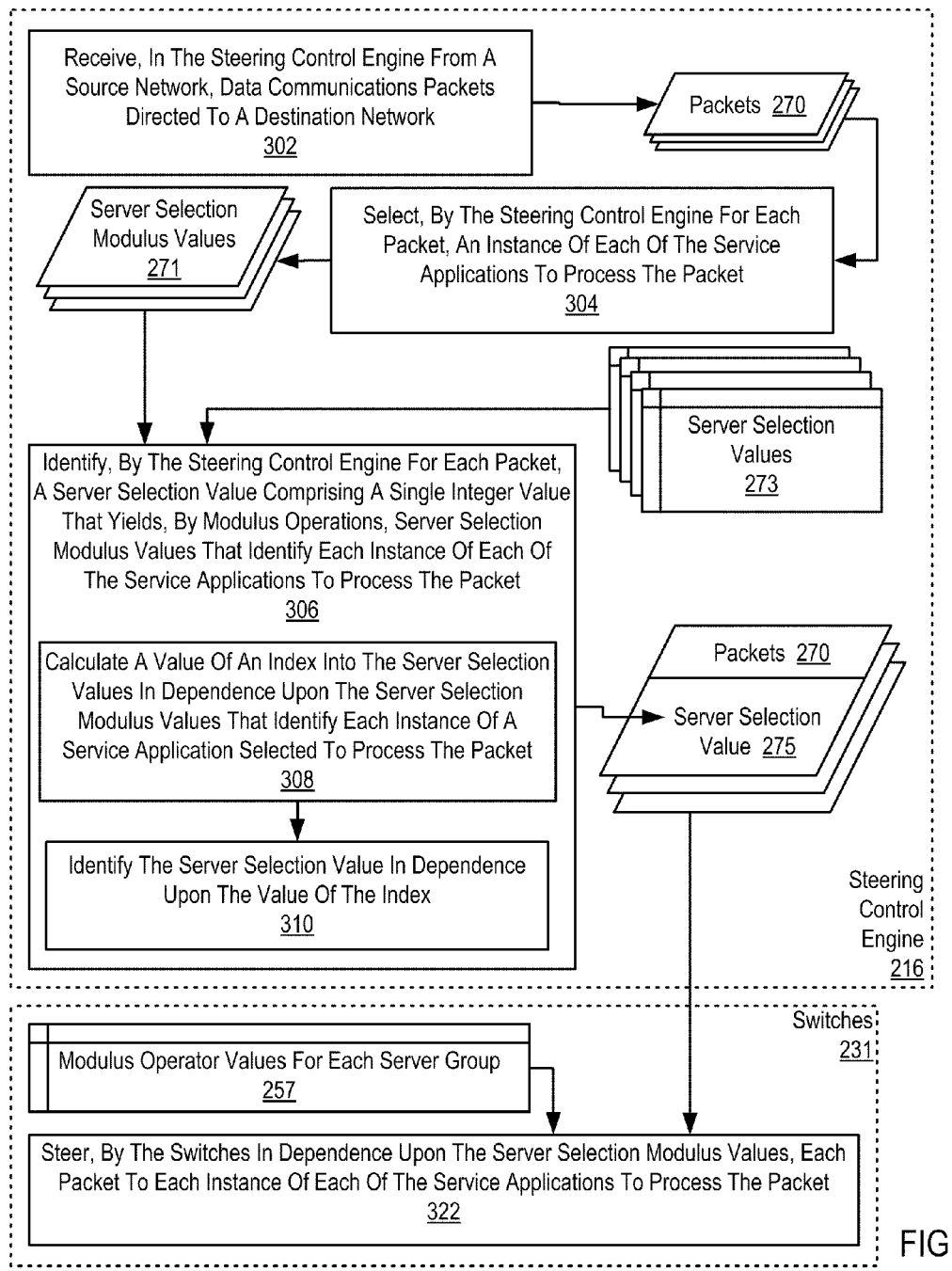
FIGS. 5, 6, and 7 set forth flow charts illustrating example methods of packet steering with server selection modulus values according to embodiments of the present invention.

For further explanation, FIG. 5 sets forth a flow chart illustrating an example method of packet steering with server selection modulus values according to embodiments of the present invention that is implemented on apparatus similar to that described and illustrated above with reference to FIG. 1, so that the method of FIG. 5 is described here with reference both to FIG. 5 and also to FIG. 1. The method of FIG. 5 is a method of steering data communications packets for transparent, bump-in-the-wire data processing among multiple service applications, with the method implemented using link-level data communications switching apparatus (150) disposed among two or more data communications networks (A, B, C). The switching apparatus (150) includes a steering control engine (216) and link-level data communications switches (231 on FIG. 5, 230-236 on FIG. 1). The service applications (254) organized in sets (215), with each set of service applications including a plurality of service applications that process a packet in a predefined sequence through the service applications in the set. The service applications execute on servers (104), with the servers organized in groups. Each server in a server group executes an instance of a same service application, with each instance of a service application identified by a server selection modulus value that is unique among the instances of a service application executing on the servers in a server group.

The method of FIG. 5 includes receiving (302), in the steering control engine from a source network, data communications packets (270) directed to a destination network. In an architecture like that of FIG. 1, the packets first arrive in the switches and are then forwarded to the steering control engine for selection of instances of service applications to process the packets and identification of a server selection value for each packet. In an architecture like that of FIG. 2, the packets are first received directly in the steering control engine itself.

The method of FIG. 5 also includes selecting (304), by the steering control engine for each packet, an instance of each of the service applications to process the packet. The output of the selecting process (304) is server selection modulus values (271), one server selection modulus value for each selected instance of a service application, each server selection modulus value uniquely identifying an instance of a service application selected to process a packet.

The method of FIG. 5 also includes identifying (306), by the steering control engine for each packet, a server selection value (275) that is a single integer value that yields, by modulus operations, server selection modulus values that identify each instance of each of the service applications to process the packet. In the method of FIG. 5, the steering control engine is configured with at least one array (273) of server selection values, like the array illustrated and described above as the left column of Table 2. The array is said to be 'at least one' because the steering control engine can be configured with multiple arrays where each array contains modulus operator values for a subset of the service application groups within a system.

In the example method of FIG. 5, identifying (306) a server selection value includes calculating (308) a value of an index into the at least one array in dependence upon the server selection modulus values that identify each instance of a service application selected to process the packet. Such a calculation of an index can be carried out according to Formula 1:

$$I = \sum_{j=1}^{k-1} (N_j \cdot M_{j+1} \cdot M_{j+2} \cdot \ldots \cdot M_k) + N_k \qquad \text{Formula 1}$$

In Formula 1, I is the value of the index, k is the number of groups of servers in a set of service applications, $M_j$ is a modulus operator value for the $j^{th}$ server group, $N_j$ is the server selection modulus value that identifies the selected server within the $j^{th}$ group of servers in a set of service applications. For an implementation with two server groups, each executing instances of two service applications, Formula 1 reduces to $I=N_1 M_2+N_2$. And if the two servers groups include respectively, as do the server groups $G_1$ and $G_2$ in the example of FIGS. 1, 5 and 3 servers each, with each server running an instance of a same service application, then $M_2=3$, and Formula 1 is further reduced to $I=3N_1+N_2$. In an example, therefore, of identifying a server selection value for a packet to be processed by the fourth instance of a service application executing in server group $G_1$ (server selection modulus value $N_1=3$) and the second instance of a service application executing in server group $G_2$ (server selection modulus value $N_2=1$), the formula yields: Index I=3*3+1=10.

Formula 1 also applies for any subset of modulus operators (service applications) defined within the array. In the case of a subset of server applications in a sequence, the value of any (and all) $N_j$ for server applications not included in the sequence can be set to any valid $N_j$ value (e.g., zero) within the formula.

In the case of multiple arrays, the set of service application groups to process the packet would determine the array to be used to derive the server selection value.

In the example method of FIG. 5, identifying (306) a server selection value also includes identifying (310) the server selection value in dependence upon the value of the index. Continuing with the example array of server selection values from the left column of Table 2, identifying a server selection value in dependence upon the value of the index can be carried, for example, taking I as the value of the index, by identifying a server selection value as the $I^{th}$ value in the array, with the index based on 0. With the example array the left column of Table 2:
  with an index value of 0, the server selection value identified by that index value is 0,
  with an index value of 1, the server selection value identified by that index value is 10,
  with an index value of 2, the server selection value identified by that index value is 5,
  with an index value of 10, as in the example just above from Formula 1, the server selection value identified by that index value is 13,
  and so on.

Figure 6:
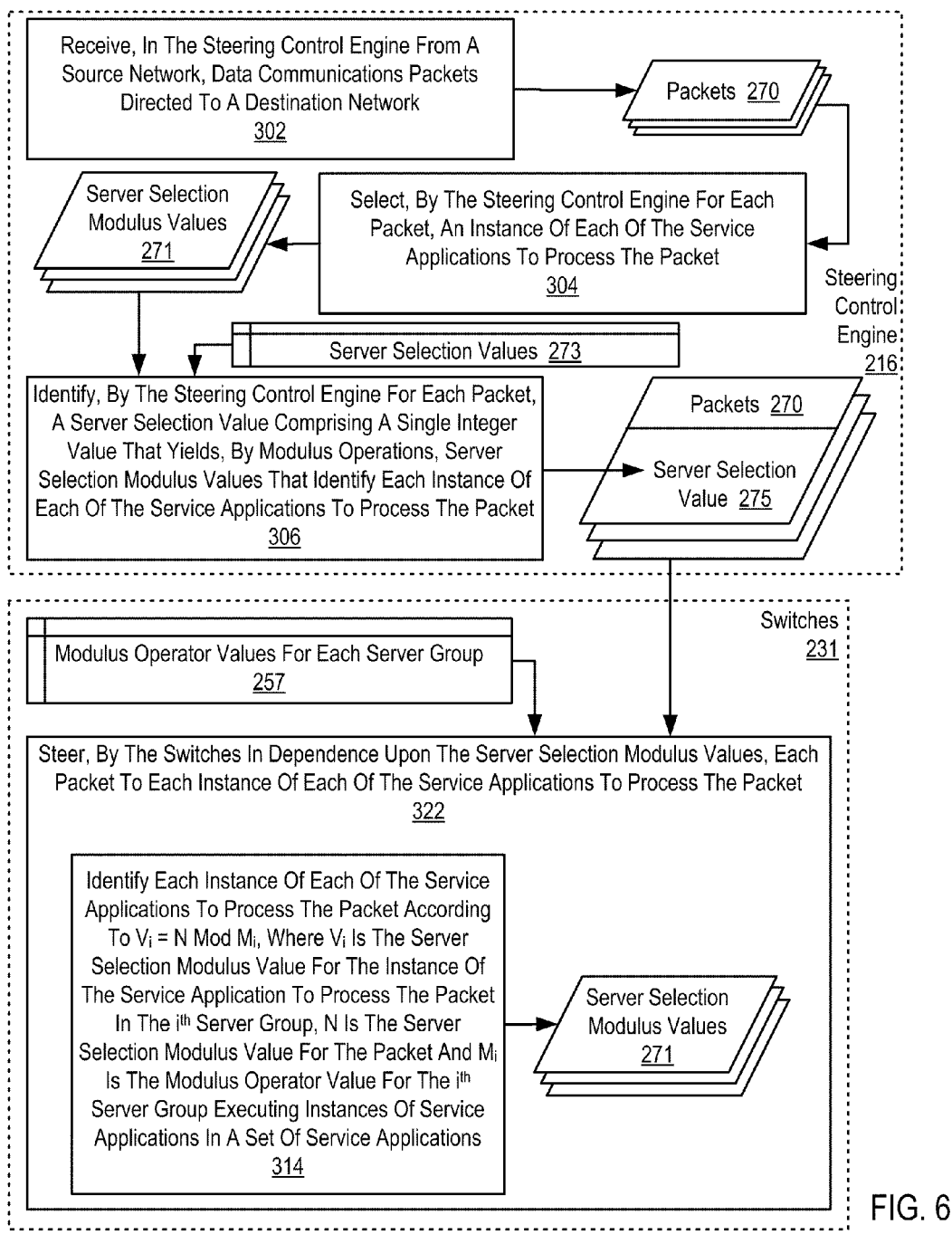

The method of FIG. 5 also includes steering, by the switches in dependence upon the server selection modulus values, each packet to each instance of each of the service applications to process the packet—explained further with regard to FIG. 6. FIG. 6 sets forth a flow chart illustrating a further example method of packet steering with server selection modulus values according to embodiments of the present invention that is similar to the method of FIG. 5, including as it does receiving (302) in a steering control engine from a source network packets directed to a destination network, selecting (304) an instance of each of the service applications in a set of service applications to process each packet, identifying (306) a server selection value for each packet, and steering (322) each packet to each instance of each of the service applications to process the packet. In support of the steering process, the switches (231) are configured with modulus operator values (257) for each server group whose servers are executing instances of service applications. The modulus operator value for a server group is typically the size of the server group, the number of servers in the server group, although it is possible for the modulus operator value for a server group to be larger than the size of the server group, selected as described above, preferably without values that are multiples of one another or have common factors. In addition in the method of FIG. 6, steering (322) each packet to each instance of each service application to process the packet includes identifying (314) each instance of each of the service applications to process the packet according to $V_i = N \bmod M_i$, where $V_i$ is the server selection modulus value for the instance of the service application to process the packet in the $i^{th}$ server group, N is the server selection modulus value for the packet and $M_i$ is the modulus operator value for the $i^{th}$ server group executing instances of service applications in a set of service applications.

Figure 7:
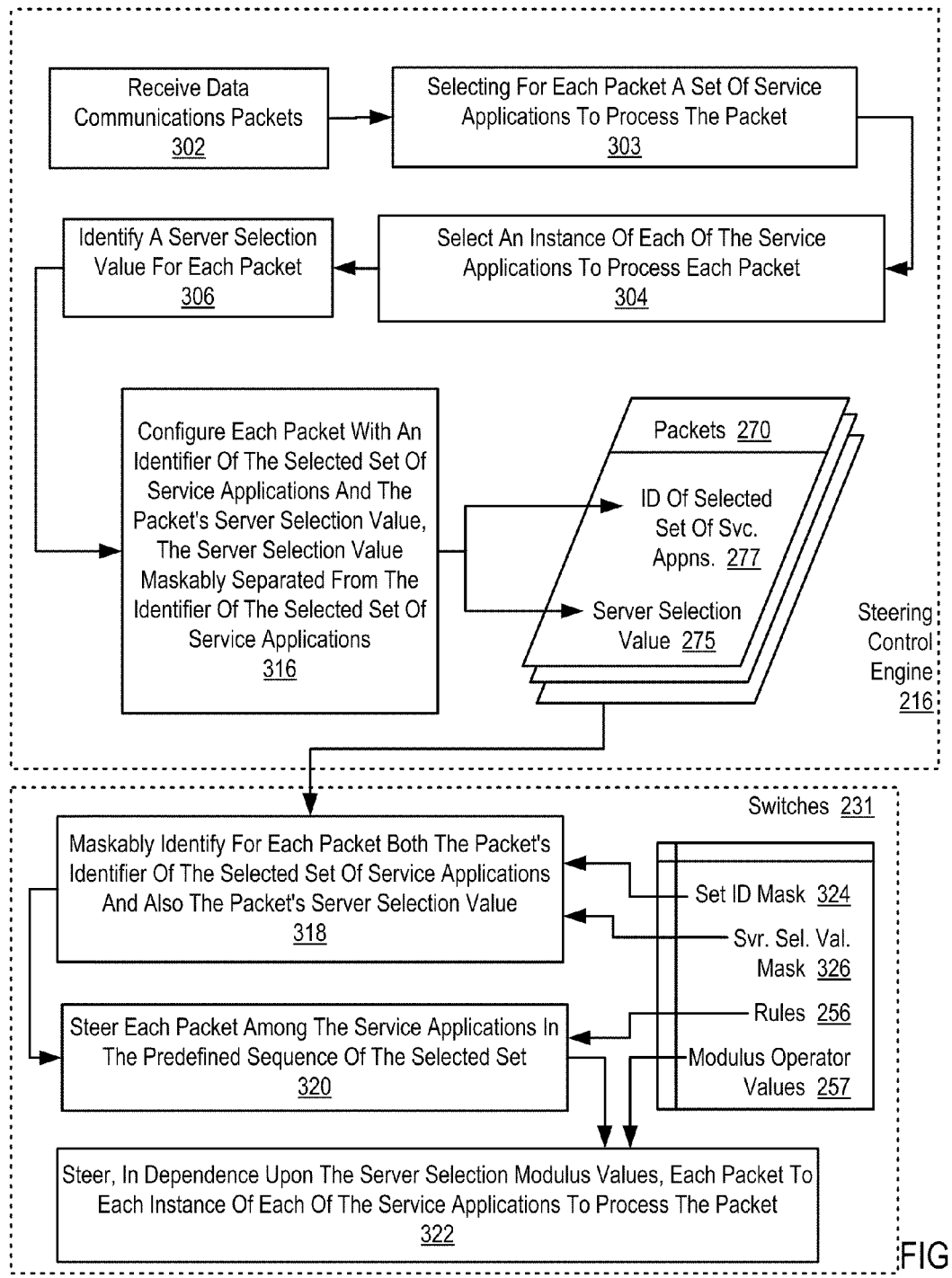

For further explanation, FIG. 7 sets forth a flow chart illustrating a further example method of packet steering with server selection modulus values according to embodiments of the present invention that also is similar to the method of FIG. 5, including as it does receiving (302) in a steering control engine from a source network packets directed to a destination network, selecting (304) an instance of each of the service applications in a set of service applications to process each packet, identifying (306) a server selection value for each packet, and steering (322) each packet to each instance of each of the service applications to process the packet. In support of the steering process, the switches (231) are configured with modulus operator values (257) for each server group whose servers are executing instances of service applications.

The method of FIG. 7 also includes selecting (303), by the steering control engine for each packet, a set of service applications to process the packet, and configuring (316) each packet with an identifier (277) of the selected set of service applications as well as the packet's server selection value (275), with the server selection value maskably separated from the identifier of the selected set of service applications. Maskable separation can be achieved by providing separate masks for the set identifier and the server selection value, either inserting the masks somewhere in the header of the packet, or, preferably, configuring the switches with the masks (324, 326). With the set identifier and the server selection value configured in, for example, one of the MAC addresses in the packet's link-level header, for a set of four service applications executing on server groups with server group sizes and therefore modulus operator values respectively of 8, 7, 5, and 3, therefore supporting 840 possible server selection values, configuring a packet with a server selection value would require masking only 10 bits of a MAC address field that typically is 48 bits in size. If the same implementation includes up to four distinct sets of service application, only two additional bits would need to be masked to configure the packet with an identifier of a set of service applications.

The method of FIG. 7 also includes maskably identifying (318) by the switches for each packet both the packet's identifier of the selected set of service applications and also the packet's server selection value. FIG. 7 shows the switches configured with a mask (324) for an identifier of a set of service applications and a mask (326) for a server selection value. Applying mask (324) to the packet's set identifier (277) yields the identity of the set of service applications, and, given the steering rules (256), also yields the sequence in which the packet is to be steered (320) among the service applications in the set. So the method of FIG. 7 also includes steering (320) by the switches (321) each packet among the service applications in the predefined sequence of the selected set—carried out by a lookup of the sequence in the ruleset (256) in dependence upon the maskably configured identifier of the set (277). Having thus inferred the sequence of service applications, the switches then steer (322) a packet to particular instances of each service application as identified by server selection modulus values derived from the packet's server selection value (275) by use of the modulus operator values (257) for each server group in which instances of service applications are to process the packet.

In view of the explanations set forth above, readers will recognize that the benefits of steering packets among service applications with server selection modulus values according to embodiments of the present invention include the facts that:

a flow control mechanism or 'steering control engine' can cause the direct assignment by a link-level switch of a packet to a particular instance of a service application within a server group;

a flow sequence may be defined through a set of service applications so that the selection of a particular instance of a service application on a particular server within each service application is set by the steering control engine and then executed by a switch based on a server selection value;

the server selection value may be appended to other control information and placed in the packet header (e.g., Source MAC or Destination MAC) and subsequently used by the switch so that the pertinent information elements are extracted from the combined value by mask operations;

link-level switches can extract server selection modulus values from the server selection value and use them to steer packets among service applications with no need for the switches or the service applications to make any modification of the packets; and link-level switches can extract server selection modulus values from the server selection value and use them to steer packets among service applications with no need to further encapsulate the packets with any additional wrapping with new headers and therefore no need for any modification of the switches or the service applications so that they understand such additional headers.

Example embodiments of the present invention in this specification are described largely in the context of fully functional automated apparatus for steering packets among service applications with server selection modulus values. Readers of skill in the art will recognize, however, that the present invention also may be embodied in a computer program product disposed upon computer readable recording media for use with any suitable data processing system. Such computer readable recording media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

The flowcharts and block diagrams in the Figures illustrate the architecture, functionality, and operation of possible implementations of apparatus, methods, and computer program products for steering packets among service applications with server selection modulus values according to various embodiments of the present invention. In this regard, each block in the flowchart or block diagrams may represent a module, segment, or portion of computer program code or automated computing machinery that embodies one or more computer program instructions or circuitry of automated computing machinery for implementing specified functions within the overall project of steering packets among service applications with server selection modulus values according to various embodiments of the present invention. Readers will also recognize that, in some alternative implementations, the functions noted in the diagram blocks may occur in the order specified in the drawings or in some other order. For example, two blocks shown in succession may, in fact, be executed substantially concurrently, or the blocks may sometimes be executed in the reverse order, depending upon the functionality involved.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of steering data communications packets for transparent, bump-in-the-wire data processing among multiple service applications, the method implemented with link-level data communications switching apparatus disposed among two or more data communications networks, the method comprising:
   receiving, in a steering control engine of the switching apparatus from a source network, data communications packets directed to a destination network, the switching apparatus comprising:
      the steering control engine and link-level data communications switches, the steering control engine comprising a module of automated computing machinery coupled for data communications to the link-level data communications switches, each link-level data communications switch comprising data communications ports, a plurality of the ports connected for data communications to the service applications;
   the service applications organized in sets, each set of service applications comprising a plurality of service applications that process a packet in a predefined sequence through the service applications in the set; the service applications executing on servers; and
   the servers organized in groups, each server in a server group executing an instance of a same service application, each instance of a service application identified by a server selection modulus value that is unique among the instances of a service application executing on the servers in a server grow;
   selecting, by the steering control engine for each packet, an instance of each of the service applications to process the packet;
   identifying, by the steering control engine for each packet, a server selection value comprising a single integer value that yields, by a plurality of modulus operations, server selection modulus values that identify each instance of each of the plurality of service applications to process the packet; and
   steering, by the switches in dependence upon the server selection modulus values, each packet to each instance of each of the plurality of service applications to process the packet.

2. The method of claim 1 wherein the steering control engine is configured with server selection values and identifying a server selection value further comprises:
   calculating a value of an index into the server selection values in dependence upon the server selection modulus values that identify each instance of a service application selected to process the packet; and
   identifying the server selection value in dependence upon the value of the index.

3. The method of claim 1 wherein the steering control engine is configured with server selection values and identifying a server selection value further comprises:
   calculating a value of an index into the server selection values in dependence upon the server selection modulus values that identify each instance of a service application selected to process the packet according to $$I = \sum_{j=1}^{k-1} (N_j \cdot M_{j+1} \cdot M_{j+2} \cdot \ldots \cdot M_k) + N_k,$$

where I is the value of the index, k is the number of groups of servers in a set of service applications, $M_j$ is a modulus operator value for the $j^{th}$ server group, $N_j$ is the server selection modulus value that identifies the selected server within the $j^{th}$ group of servers in a set of service applications; and
   identifying the server selection value in dependence upon the value of the index.

4. The method of claim 1 wherein:
   each switch is further configured with a modulus operator value for each server group, the modulus operator value determined according to the number of servers within each server group; and
   steering each packet further comprises identifying each instance of each of the service applications to process the packet according to $V_i = N \bmod M_i$, where $V_i$ is the server selection modulus value for the instance of the service application to process the packet in the $i^{th}$ server group, N is the server selection modulus value for the packet and $M_i$ is the modulus operator value for the $i^{th}$ server group executing instances of service applications in a set of service applications.

5. The method of claim 1 further comprising:
   selecting, by the steering control engine for each packet, a set of service applications to process the packet; and configuring by the steering control engine each packet with an identifier of the selected set of service applications;
wherein steering each packet by the switches further comprises steering each packet among the service applications in the selected set of service applications.

6. The method of claim 1 further comprising:
selecting, by the steering control engine for each packet, a set of service applications to process the packet;
configuring by the steering control engine each packet with an identifier of the selected set of service applications and the packet's server selection value, the server selection value maskably separated from the identifier of the selected set of service applications;
maskably identifying by the switches for each packet both the packet's identifier of the selected set of service applications and also the packet's server selection value; and
steering by the switches each packet among the service applications in the predefined sequence of the selected set.

7. Link-level data communications switching apparatus for steering data communications packets for transparent, bump-in-the-wire data processing among multiple service applications, the switching apparatus disposed among two or more data communications networks, the switching apparatus comprising:
a steering control engine and link-level data communications switches, the steering control engine comprising a module of automated computing machinery coupled for data communications to the link-level data communications switches, each link-level data communications switch comprising data communications ports, a plurality of the ports connected for data communications to the service applications;
the service applications organized in sets, each set of service applications comprising a plurality of service applications that process a packet in a predefined sequence through the service applications in the set; the service applications executing on servers;
the servers organized in groups, each server in a server group executing an instance of a same service application, each instance of a service application identified by a server selection modulus value that is unique among the instances of a service application executing on the servers in a server group;
the switching apparatus configured to function by:
receiving, in the steering control engine from a source network, data communications packets directed to a destination network;
selecting, by the steering control engine for each packet, an instance of each of the service applications to process the packet;
identifying, by the steering control engine for each packet, a server selection value comprising a single integer value that yields, by a plurality of modulus operations, server selection modulus values that identify each instance of each of the plurality of service applications to process the packet; and
steering, by the switches in dependence upon the server selection modulus values, each packet to each instance of each of the plurality of service applications to process the packet.

8. The switching apparatus of claim 7 wherein the steering control engine is configured with server selection values and identifying a server selection value further comprises:
calculating a value of an index into the server selection values in dependence upon the server selection modulus values that identify each instance of a service application selected to process the packet; and
identifying the server selection value in dependence upon the value of the index.

9. The switching apparatus of claim 7 wherein the steering control engine is configured with server selection values and identifying a server selection value further comprises:
calculating a value of an index into the server selection values in dependence upon the server selection modulus values that identify each instance of a service application selected to process the packet according to $$I = \sum_{j=1}^{k-1} (N_j \cdot M_{j+1} \cdot M_{j+2} \cdot \ldots \cdot M_k) + N_k,$$

where I is the value of the index, k is the number of groups of servers in a set of service applications, $M_j$ is a modulus operator value for the $j^{th}$ server group, $N_j$ is the server selection modulus value that identifies the selected server within the $j^{th}$ group of servers in a set of service applications; and
identifying the server selection value in dependence upon the value of the index.

10. The switching apparatus of claim 7 wherein:
each switch is further configured with a modulus operator value for each server group, the modulus operator value determined according to the number of servers within each server group; and
steering each packet further comprises identifying each instance of each of the service applications to process the packet according to $V_i = N \bmod M_i$, where $V_i$ is the server selection modulus value for the instance of the service application to process the packet in the $i^{th}$ server group, N is the server selection modulus value for the packet and $M_i$ is the modulus operator value for the $i^{th}$ server group executing instances of service applications in a set of service applications.

11. The switching apparatus of claim 7 further configured to function by:
selecting, by the steering control engine for each packet, a set of service applications to process the packet; and
configuring by the steering control engine each packet with an identifier of the selected set of service applications;
wherein steering each packet by the switches further comprises steering each packet among the service applications in the selected set of service applications.

12. The switching apparatus of claim 7 further configured to function by:
selecting, by the steering control engine for each packet, a set of service applications to process the packet;
configuring by the steering control engine each packet with an identifier of the selected set of service applications and the packet's server selection value, the server selection value maskably separated from the identifier of the selected set of service applications;
maskably identifying by the switches for each packet both the packet's identifier of the selected set of service applications and also the packet's server selection value; and
steering by the switches each packet among the service applications in the predefined sequence of the selected set.

13. A computer program product for steering data communications packets for transparent, bump-in-the-wire data processing among multiple service applications, the computer program product disposed upon a machine-readable recording medium, wherein the machine-readable recording medium is not a signal, the computer program product configured for installation within link-level data communications switching apparatus disposed among two or more data communications networks, the switching apparatus comprising:
a steering control engine and link-level data communications switches; the steering control engine comprising a module of automated computing machinery coupled for data communications to the link-level data communications switches, each link-level data communications switch comprising data communications ports, a plurality of the ports connected for data communications to the service applications,
the service applications organized in sets, each set of service applications comprising a plurality of service applications that process a packet in a predefined sequence through the service applications in the set; the service applications executing on servers;
the servers organized in groups, each server in a server group executing an instance of a same service application, each instance of a service application identified by a server selection modulus value that is unique among the instances of a service application executing on the servers in a server group,
the computer program product comprising computer program instructions that, when installed within and executed by the link-level data communications switching apparatus, cause the link-level data communications switching apparatus to function by:
receiving, in the steering control engine from a source network, data communications packets directed to a destination network;
selecting, by the steering control engine for each packet, an instance of each of the service applications to process the packet;
identifying, by the steering control engine for each packet, a server selection value comprising a single integer value that yields, by a plurality of modulus operations, server selection modulus values that identify each instance of each of the plurality of service applications to process the packet; and
steering, by the switches in dependence upon the server selection modulus values, each packet to each instance of each of the plurality of service applications to process the packet.

14. The computer program product of claim 13 wherein the steering control engine is configured with server selection values and identifying a server selection value further comprises:
calculating a value of an index into the server selection values in dependence upon the server selection modulus values that identify each instance of a service application selected to process the packet; and
identifying the server selection value in dependence upon the value of the index.

15. The computer program product of claim 13 wherein the steering control engine is configured with server selection values and identifying a server selection value further comprises:
calculating a value of an index into the server selection values in dependence upon the server selection modulus values that identify each instance of a service application selected to process the packet according to $$I = \sum_{j=1}^{k-1}(N_j \cdot M_{j+1} \cdot M_{j+2} \cdot \ldots \cdot M_k) + N_k,$$

where I is the value of the index, k is the number of groups of servers in a set of service applications, $M_j$ is a modulus operator value for the $j^{th}$ server group, $N_j$ is the server selection modulus value that identifies the selected server within the $j^{th}$ group of servers in a set of service applications; and
identifying the server selection value in dependence upon the value of the index.

16. The computer program product of claim 13 wherein:
each switch is further configured with a modulus operator value for each server group, the modulus operator value determined according to the number of servers within each server group; and
steering each packet further comprises identifying each instance of each of the service applications to process the packet according to $V_i = N \bmod M_i$, where $V_i$ is the server selection modulus value for the instance of the service application to process the packet in the $i^{th}$ server group, N is the server selection modulus value for the packet and $M_i$ is the modulus operator value for the $i^{th}$ server group executing instances of service applications in a set of service applications.

17. The computer program product of claim 13 further comprising computer program instructions that, when installed within and executed by the link-level data communications switching apparatus, cause the link-level data communications switching apparatus to function by:
selecting, by the steering control engine for each packet, a set of service applications to process the packet; and
configuring by the steering control engine each packet with an identifier of the selected set of service applications;
wherein steering each packet by the switches further comprises steering each packet among the service applications in the selected set of service applications.

18. The computer program product of claim 13 further comprising computer program instructions that, when installed within and executed by the link-level data communications switching apparatus, cause the link-level data communications switching apparatus to function by:
selecting, by the steering control engine for each packet, a set of service applications to process the packet;
configuring by the steering control engine each packet with an identifier of the selected set of service applications and the packet's server selection value, the server selection value maskably separated from the identifier of the selected set of service applications;
maskably identifying by the switches for each packet both the packet's identifier of the selected set of service applications and also the packet's server selection value; and
steering by the switches each packet among the service applications in the predefined sequence of the selected set.

* * * * *